(12) United States Patent
Lu et al.

(10) Patent No.: US 8,551,906 B2
(45) Date of Patent: Oct. 8, 2013

(54) TITANATE PHOTOCATALYST

(75) Inventors: Gao Qing Lu, Mt. Ommaney (AU); Lianzhou Wang, Kenmore (AU)

(73) Assignee: The University of Queensland, Queensland (AU)

( * ) Notice: Subject to any disclaimer, the term of this patent is extended or adjusted under 35 U.S.C. 154(b) by 314 days.

(21) Appl. No.: 12/673,693

(22) PCT Filed: Aug. 15, 2008

(86) PCT No.: PCT/AU2008/001188
§ 371 (c)(1),
(2), (4) Date: Feb. 10, 2011

(87) PCT Pub. No.: WO2009/021292
PCT Pub. Date: Feb. 19, 2009

(65) Prior Publication Data
US 2011/0130272 A1 Jun. 2, 2011

(30) Foreign Application Priority Data

Aug. 16, 2007 (AU) .................. 2007904408

(51) Int. Cl.
*B01J 27/24* (2006.01)
*B01J 21/02* (2006.01)
*B01J 27/00* (2006.01)
*B01J 27/02* (2006.01)
*B01J 23/00* (2006.01)
*B01J 8/02* (2006.01)
*C01G 23/047* (2006.01)

(52) U.S. Cl.
USPC .......... 502/200; 502/202; 502/208; 502/216; 502/350; 423/610; 423/659

(58) Field of Classification Search
USPC .......... 502/200, 202, 208, 216, 350; 423/610, 423/659
See application file for complete search history.

(56) References Cited

U.S. PATENT DOCUMENTS 3,331,658 A * 7/1967 Lewis et al. ............. 423/598
3,952,090 A * 4/1976 Shimizu et al. .......... 423/598

(Continued)

FOREIGN PATENT DOCUMENTS

EP 1 118 385 7/2001
JP 2002-104825 4/2002

(Continued)

OTHER PUBLICATIONS

"Preparation and characterization of iodine-doped mesoporous TiO2 by hydrothermal method," Wang Wei-an et al. Applied Surface Science 257 (2011), pp. 3688-3696.*

(Continued)

Primary Examiner — Patricia L Hailey
(74) Attorney, Agent, or Firm — Nixon & Vanderhye P.C.

(57) ABSTRACT

The invention relates to a titanate photocatalyst of formula (I): $H_mA_{x-m}Ti_yO_zD_n$ (I) wherein: A is a cation selected from the group consisting of lithium, sodium, potassium, rubidium, caesium and francium; D is a dopant selected from the group consisting of boron, carbon, nitrogen, fluorine, sulphur, phosphorus and iodine; x is a value between 0 and 8; y is a value greater than 0 and less than or equal to 8; n is a value greater than 0 and less than or equal to 8; z is a value greater than 0 and less than or equal to 8; and m is a value between 0 and 8. The invention also relates to method of production and uses of the titanate photocatalyst.

20 Claims, 6 Drawing Sheets

(56) References Cited

U.S. PATENT DOCUMENTS

| | | | |
|---|---|---|---|
| 5,863,514 | A | 1/1999 | Sasaki et al. |
| 6,066,359 | A | 5/2000 | Yao et al. |
| 6,368,668 | B1 | 4/2002 | Kobayashi et al. |
| 6,680,277 | B2* | 1/2004 | Morikawa et al. ............ 502/182 |
| 6,752,973 | B2 | 6/2004 | Okusako |
| 6,787,236 | B2 | 9/2004 | Kimura et al. |
| 7,011,808 | B2 | 3/2006 | Sakatani et al. |
| 7,033,566 | B2 | 4/2006 | Arakawa et al. |
| 7,175,911 | B2 | 2/2007 | Zhou et al. |
| 7,211,513 | B2* | 5/2007 | Remington, .................. 438/680 |
| 7,341,960 | B2 | 3/2008 | Lee et al. |
| 7,521,391 | B2* | 4/2009 | Sakatani et al. ............. 502/239 |
| 7,521,394 | B2* | 4/2009 | Xie et al. ..................... 502/350 |
| 7,771,688 | B2* | 8/2010 | Lee et al. ..................... 423/386 |
| 7,901,660 | B2* | 3/2011 | Xie et al. ..................... 423/598 |
| 8,148,289 | B2* | 4/2012 | Taniguchi et al. ............ 502/224 |
| 2002/0169076 | A1* | 11/2002 | Takeshi et al. ................ 502/350 |
| 2008/0003153 | A1 | 1/2008 | Matsumoto et al. |
| 2011/0009258 | A1* | 1/2011 | Kang et al. ................... 502/400 |

FOREIGN PATENT DOCUMENTS

| | | |
|---|---|---|
| JP | 2005-350293 | 12/2005 |
| JP | 2005-288316 | 10/2008 |
| JP | 2006-144052 | 10/2008 |
| WO | WO 2008/009919 | 1/2008 |
| WO | WO 2009/065179 | 5/2009 |
| WO | WO 2009/065180 | 5/2009 |

OTHER PUBLICATIONS

"Microwave-assisted hydrothermal synthesis of N-doped titanate nanotubes for visible-light-responsive photocatalysis," Yen-Ping Peng et al. Journal of Hazardous Materials 183 (2010), pp. 754-758.*

"Pillaring and photocatalytic property of partially substituted layered titanates, Na2Ti3-xMxO7 and K2Ti4-xMxO9 (M=Mn, Fe, Co, Ni, Cu)," Masato Machida et al. Journal of Molecular Catalysis A: Chemical 155 (2000), pp. 131-142.*

"Drastically enhanced photocatalytic activity in nitrogen doped mesoporous TiO2 with abundant surface states," Gang Liu et al. Journal of Colloid and Interface Science 334 (2009), pp. 171-175.*

"A magnetic TiO2 photocatalyst doped with iodine for organic pollutant degradation," Zhiqiao He et al. Separation and Purification Technology 96 (2012), pp. 50-57.*

"Fabrication of multilayer films of N-doped titania nanosheets and hematite nanocubes via layer by layer assembly," Min Guo et al. Colloids and Surfaces A: Physicochem. Eng. Aspects 395 (2012), pp. 100-104.*

"Characterization and photocatalytic activity of K+-doped TiO2 photocatalysts," Lung-Chuan Chen et al. Journal of Molecular Catalysis A: Chemical 265 (2007), pp. 133-140.*

* cited by examiner

TITANATE PHOTOCATALYST

This application is the U.S. national phase of International Application No. PCT/AU2008/001188, filed 15 Aug. 2008, which designated the U.S. and claims priority to Australian Application No. 2007904408, filed 16 Aug. 2007, the entire contents of each of which are hereby incorporated by reference.

FIELD OF THE INVENTION

The invention relates to a photocatalyst. In particular, the invention relates to a titanate based photocatalyst and more particularly, the invention relates to a doped titanate photocatalyst. The invention also relates to methods of production of the photocatalyst and to the use and methods utilising the photocatalysts in the reduction or elimination of environmental pollutants.

BACKGROUND TO THE INVENTION

It should be understood that any discussion of the background art throughout the specification should in no way be considered as an admission that such background art is prior art, nor that such background art is widely known or forms part of the common general knowledge in the field of the invention.

Due to increasing social demands to protect the environment and eliminate or reduce environmental pollutants there has been an increased interest in the use of photocatalysts to decompose pollutants. Photocatalysts are able to decompose pollutants, in particular organic pollutants in water and air, but usually only when irradiated with light at a suitable wavelength. Photocatalysts are also used to produce hydrogen and oxygen from water, via a splitting reaction.

Photocatalysts generally require irradiation with light in the UV spectrum (having a wavelength of between 250 to 400 nm) in order to provide any catalytic effect. UV-light comprises approximately 5% of the solar spectra. Accordingly, the use of photocatalysts requires the use of an external source of UV light radiation. Thus, it is believed that currently known photocatalysts are not typically energy efficient. In addition, in order to achieve increased photocatalytic performance, photocatalysts usually require very small particle size and as a result may be difficult to recover.

Production of photocatalysts which are catalytically effective in the visible light spectrum (having a wavelength of between 400 to 700 nm) have been described. Photocatalysts which show some activity in the visible light spectrum include titania photocatalysts which are described in Asahi, R., et al, *Science*, 2001, 293, 269. However, only a very small shoulder absorption in the visible light range in this type of material was demonstrated.

In Chen X. et al, Chem. Rev., 2007, 107, 2891-2959, there is also described titanium dioxide nanomaterials which are considered ineffective as a photocatalyst.

Accordingly, the applicant believes that these photocatalysts suffer from the disadvantage that they are ineffective, expensive to produce and/or difficult to recover.

The invention seeks to overcome these disadvantages or to provide an alternative to the prior art.

DEFINITIONS

The following part of the specification provides some definitions that may be useful in understanding the description of the present invention. These are intended as general definitions and should in no way limit the scope of the present invention to those terms alone, but are put forth for a better understanding of the following description.

Unless the context requires otherwise or specifically stated to the contrary, integers, steps, or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of elements or integers. Thus, in the context of this specification, the term "comprising" is used in an inclusive sense and thus should be understood as meaning "including principally, but not necessarily solely".

SUMMARY OF THE INVENTION

According to one aspect of the invention there is provided a titanate photocatalyst of formula (I):

$$H_m A_{x-m} Ti_y O_z D_n \qquad (I)$$

wherein:
A is a cation selected from the group consisting of lithium, sodium, potassium, rubidium, caesium and francium;
D is a dopant selected from the group consisting of boron, carbon, nitrogen, fluorine, sulphur, phosphorus and iodine;
x is a value between 0 and 8;
y is a value greater than 0 and less than or equal to 8;
n is a value greater than 0 and less than or equal to 8
z is a value greater than 0 and less than or equal to 8; and
m is a between a value between 0 and 8

In a further aspect, the invention provides a titanate photocatalyst of formula (Ia):

$$A_x Ti_y O_z D_n \qquad (Ia)$$

wherein:
A is a cation selected from the group consisting of lithium, sodium, potassium, rubidium, caesium and francium;
D is a dopant selected from the group consisting of boron, carbon, nitrogen, fluorine, sulphur, phosphorus and iodine;
x and y are independently a value greater than 0 and equal to or less than 8; and
n and z are independently a value greater than 0 and less than or equal to 8.

The titanate photocatalyst may be a photocatalyst of formula (Ia) wherein A is selected from lithium, sodium, and potassium, or A is selected from caesium, rubidium or francium; and D is nitrogen, fluorine, sulphur, phosphorous or iodine. The titanate photocatalyst may also be a photocatalyst of formula (Ia) wherein A is caesium or rubidium and D is nitrogen, sulphur phosphorous or iodine. In another embodiment, the titanate photocatalyst may be a photocatalyst of formula (Ia) wherein A is caesium and D is nitrogen.

In a specific example, the titanate photocatalyst of formula (Ia) may be CsTiON.

In a further aspect, the invention provides a titanate photocatalyst of formula (Ib):

$$H_m A_{x-m} Ti_y O_z D_n \qquad (Ib)$$

wherein:
A is a cation selected from the group consisting of lithium, sodium, potassium, rubidium, caesium and francium;
D is a dopant selected from the group consisting of boron, carbon, nitrogen, fluorine, sulphur, phosphorus and iodine;

x is a value either equal to m or greater than m and a value which is greater than 0 and less than or equal to 8;
y is a value greater than 0 and less than or equal to 8;
n and z are independently a value greater than 0 and less than or equal to 8; and
m is a value between 0 and 8.

The titanate photocatalyst of formula (Ib) may include a photocatalyst where x and y are independently a value between 0.5 and 1; z and n are independently a value between 1 and 2; m is a value between 0 and x; and D is nitrogen.

Another embodiment of the titanate photocatalyst of formula (Ib) is when m, x, y, z and n are all 1; and D is nitrogen.

Another preferred embodiment of the titanate photocatalyst of formula (Ib) is when m and x are both 0; y, z and n are all 1 and D is nitrogen.

In another aspect of the invention there is provided a method of producing a titanate photocatalyst of formula (Ia), including the steps of:
a) forming a mixture comprising at least one cation donor precursor and at least one titanate precursor;
b) calcining the mixture to form a cation intercalated titanate; and
c) contacting the cation intercalated titanate with a dopant and calcining to form a photocatalyst of formula (Ia).

The at least one cation donor precursor may be an alkali metal salt selected from the group consisting of alkali metal halides; alkali metal sulphides; alkali metal sulphates; alkali metal carbonates; alkali metal nitrates; alkali metal hydroxides; alkali metal acetates; alkali metal dimethenylamine (AN$(CH_2)_2$); alkali metal oxide; alkali metal chlorate, alkali metal phosphate and mixtures thereof.

The at least one titanate precursor may be selected from the group consisting of titanium nitride (TiN); titanium carbide (TiC), titanium cyanide ($TiC_xN_y$), titanium diboride ($TiB_2$); titanium sulphide ($TiS_2$), titanium halide, (including $TiBr_4$ $TiCl_4$, $TiCl_3$, $TiF_3$, $TiF_4$, and $TiI_4$), titanium oxides (including TiO, $Ti_2O_3$, $Ti_3O_5$, $TiO_2$, $TiO_xN_y$, $TiO_xC_y$), titanium hydroxides (such as $Ti(OH)_4 \cdot xH_2O$); titanium phosphide (TiP); titanium sulphates (including $Ti_2SO_4 \cdot xH_2O$, $Ti_2(SO_4)_3$, and $TiOSO_4 \cdot xH_2SO_4$), titanium silicides ($TiSi_2$); or organic titanium compounds (including $Ti(OCH(CH_3)_2)_4$, $Ti[O(CH_2)_3CH_3]_4$, and $Ti(OCH_3)_4 \cdot (CH_3OH)_x$) and mixtures thereof.

The at least one cation donor precursor and said at least one titanate precursor may be calcined at a temperature of between 500° C. to 1200° C. for a period between 0.5-40 hours. The at least one cation donor precursor and said at least one titanate precursor may also be calcined at a temperature of between 600° C. to 1000° C. for a period between 2 hours to 40 hours, 2 hours to 35 hours or 2 hours to 30 hours.

The cation donor precursor and the titanate precursor are more suitably calcined at a temperature of about 750° C. for a period about 20 hours.

The dopant may be any compound or composition which is capable of donating the appropriate dopant atoms to form the doped titanate photocatalyst. The dopant may be selected from an inorganic or organic compound. The inorganic compound or organic compound may be in solid, liquid or gas form.

The dopant may also be a fluid, ie liquid or gas. The dopant gas may also be selected from the group consisting of nitrogen, ammonia, methane, ethylene, propane, butane, gas comprising $B_xH_y$, carbon monoxide, ammonia, carbon dioxide, hydrogen sulphide, fluorine and suitable mixtures thereof.

The dopant gas may be mixed with one or more inert or non-reactive gases, including but not limited to nitrogen, ammonia, argon, helium, hydrogen or air. The dopant gas and the inert or non-reactive gas mixture may be present in a 1:1, 1:2, 1:3, 1:4, or 1:5 volume ratio of dopant gas to inert or non-reactive gas. Alternatively, the dopant gas and the inert and non-reactive gas mixture are present in a 5:1, 4:1, 3:1, or 2:1 volume ratio of dopant gas to inert or non-reactive gas.

The dopant may also be an organic compound which comprises one or more of the following compounds selected from the group consisting of: $C_6H_{12}N_4$, $CO(NH_2)_2$, $CS(NH_2)_2$, triethylamine, $(NH_4)_2CO_3$, $C_{25}H_{31}N_3$, $C_{12}H_{22}O_{11}$, $C_{25}H_{30}O_5$. $C_6H_{12}$, $C_6H_{12}O_2$, $C_6H_{12}BNO_3$, $C_7H_5BF_4O_2$, $C_7H_7BO_4$, $H_3N \cdot BH_3$, $C_6H_5N(C_2H_5)_2 \cdot BH_3$, $CS(NH_2)_2$, $C_7H_7SO_2$, $C_7H_{12}O_2S$, $C_6H_4S$, $C_4Cl_2F_6$, $C_4H_2F_2N_2$, $C_4H_6BrF$, $C_4H_9I$, $C_5H_3IO_2$, $C_5H_3FI$, and $C_6H_{13}I$.

The dopant may also be selected from one or more inorganic compounds which may be in solution. The dopant may be selected from one or more members of the following group consisting of carbon, boron, $H_3BO_3$, sulphur, $(NH_4)_2S$, iodine, $HIO_3$, $HIO_4$, $NH_4I$ and $NH_4IO_3$.

The cation intercalated titanate may be calcined with the dopant in the presence of one or more non-reactive or inert gases. The non-reactive or inert gases may be selected from the group consisting of ammonia, nitrogen, oxygen, hydrogen, argon, helium, and air.

The cation intercalated titanate may be calcined with the dopant at a temperature between about 200° C. to 1800° C., 300° C. to 1700° C., 400° C. to 1600° C., 500° C. to 1500° C., 600° C. to 1400° C., 600° C. to 1300° C., 600° C. to 1200° C., 600° C. to 1100° C., 600° C. to 1000° C., 600° C. to 900° C., 600° C. to 800° C. or about 650° C. to 750° C. for a period of between 30 mins and 5 days.

The cation intercalated titanate may be calcined in contact with the dopant at a temperature of between 600° C. and 1000° C. for a period between 30 mins and 3 days, 30 mins to 2 days, 30 mins to a day, 30 mins to 18 hours, 30 mins to 12 hours, 30 mins to 6 hours, 30 mins to 3 hours or 45 mins to 2 hours.

The cation intercalated titanate may be calcined in contact with the dopant at a temperature of about 700° C. for a period of about 60 mins.

In another aspect the invention provides a method of producing a titanate photocatalyst of formula (Ib) which includes the steps of;
a) placing the photocatalyst of formula (Ia) in acidic solution to form a photocatalyst of formula (Ib); and
b) separating and drying the photocatalyst of formula (Ib).

The acidic solution may be selected from the group consisting of hydrochloric acid, nitric acid, sulphuric acid, phosphoric acid, hydrogen fluorine, hydrogen iodine, hydrogen bromide, acetic acid (HAC), perchlorate acid, iodic acid ($HIO_3$), periodic acid ($HIO_4$) and mixtures thereof.

The acidic solution may be selected from hydrochloric acid, nitric acid, sulphuric acid, phosphoric acid and mixtures thereof.

The acidic solution may in one example be hydrochloric acid. The acid solution may be 0.001M to 15M hydrochloric acid.

The photocatalyst of formula (Ia) may be in the acidic solution for a period up to seven days, six days, five days, four days, three days, two days or a day. The photocatalyst of formula (Ia) may also be in the acidic solution for a period of approximately three days.

In a further aspect of the invention, there is provided a method of producing a titanate photocatalyst of formula (Ib), wherein the value of m is reduced by an amount a, where a is a value less than or equal to the value of m, and x-m is 0, which includes:
a) heating a first photocatalyst of formula (Ib), wherein m is a value greater than 0 and less than or equal to 8; and x-m is 0, at a temperature of between room temperature and about 800° C. to form a second photocatalyst of formula (Ib) wherein the value of m is reduced by an amount a, where a is a value less than or equal to the value of m.

The first photocatalyst may be an initial photocatalyst of formula (Ib) and the second photocatalyst may be a final photocatalyst of formula (Ib).

The value of m in the first photocatalyst of formula (Ib) may be a value of 1.

The value of m in the second photocatalyst of formula (Ib) may be a value of 0.

The first photocatalyst may be heated at a temperature of between 50° C. and 800° C., between 50° C. and 700° C., between 50° C. and 600° C., between 100° C. and 600° C., between 150° C. and 600° C., or between 200° C. and 600° C. The first photocatalyst may also be heated at a temperature of between 200° C. and 600° C., between 300° C. and 600° C., or between 400° C. and 600° C.

In another aspect of the invention, there is provided a use of the titanate photocatalyst of the invention in the reduction or substantial elimination of pollutants in an atmosphere.

In a further aspect of the invention, there is provided a method of or reducing or substantially eliminating pollutants in an atmosphere including providing a titanate catalyst of any one of claims 1 to 8 in an atmosphere having suitable light, and converting said pollutants to a substantially inert state.

DETAILED DESCRIPTION OF PREFERRED EMBODIMENTS

A more detailed description of the invention will now be provided. It should however be understood that the following description is provided for exemplification only and should not be construed as limiting on the invention in any way. In the following description reference will be made to the drawings, in which:

FIG. 1 illustrates the XRD pattern for a photocatalyst of formula (Ia) (specifically CsTiON) and an intermediate composition (CsTiO).

FIG. 2 SEM micrograph of the CsTiON photocatalyst.

FIG. 3 is a particle size distribution of the CsTiON photocatalyst.

FIG. 4 presents the XPS depth profiles of elements Cs, Ti, O, N in the CsTiON photocatalyst FIG. 5 illustrates the XRD pattern for a photocatalyst of formula (Ib) (HTiON) and the protonated form (HTiO) of an intermediate composition (CsTiO).

FIG. 6 SEM micrograph of the HTiON photocatalyst.

Figure 1:
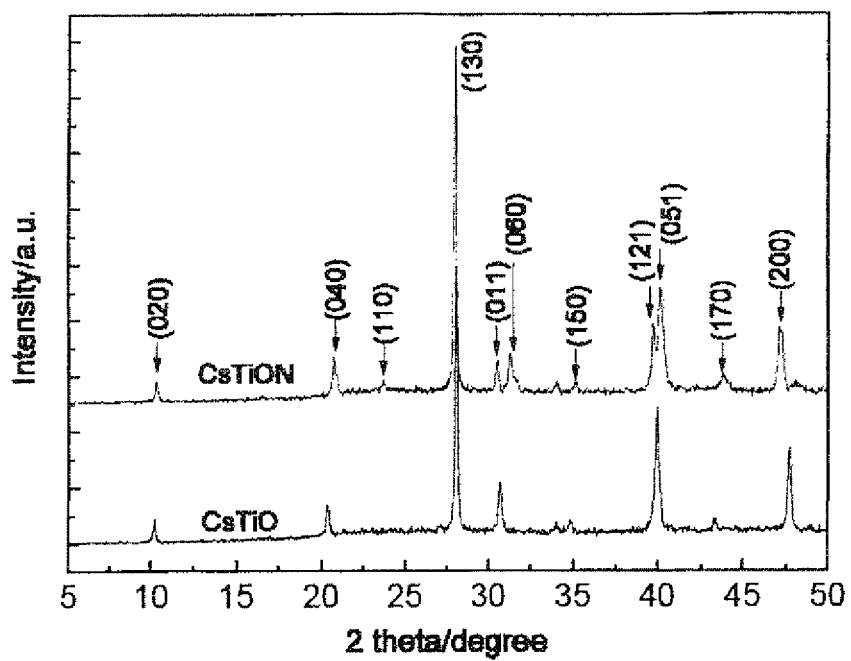

The photocatalyst of formula (I) may be formed by mixing and calcining two precursors (at least a cation donor precursor and at least one titanate precursor), prior to calcining with a dopant. The dopant may be any inorganic or organic compound or composition which when calcined with the precursors donates the desired dopant atom to the photocatalyst. The resultant photocatalyst of formula (Ia) may then undergo an ion exchange step to form the protonated doped titanate photocatalysts of formula (Ib).

The reaction mechanism can be summarised as follows:

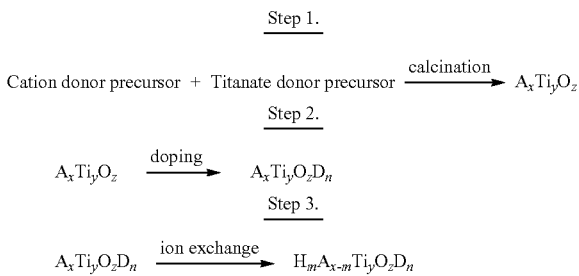

The calcining of step one is preferably carried out at a temperature between 500° C. to 1200° C. for a period between 2-40 hours, 2-35 hours or 2-30 hours.

The doping of step two is preferably carried out by contacting the cation intercalated titanate ($A_xTi_yO_z$) with a dopant and calcining at a temperature between 200° C. to 1800° C. for a period between 30 mins and 5 days.

The cation intercalated titanate produced by step 2, above, has a layered structure in which titanate layers are intercalated with the cation. The dopant stoichiometrically replaces oxygen from the titanate layers to form the doped cation intercalated titanate or photocatalyst of formula (Ia).

It will be appreciated that the conditions for the doping of step 2 will vary depending on the type of dopant used to exchange with oxygen in the cation intercalated titanate.

By way of example if the dopant is nitrogen the cation intercalated titanate may be calcined in a gaseous atmosphere containing ammonia gas or nitrogen, or in contact with a nitrogen contain organic substance such as $C_6H_{12}N_4$, $CO(NH_2)_2$, $CS(NH_2)_2$, triethylamine, $(NH_4)_2CO_3$, $C_{25}H_{31}N_3$.

When the dopant is carbon the gaseous atmosphere may be a gas comprising shorter straight chain alkanes ($C_xH_y$) such as methane, propane ethylene, propane and butane, carbon monoxide (CO) and/or carbon dioxide ($CO_2$). Alternatively, any simple organic substance, such as alkane, alkene, $C_{12}H_{22}O_{11}$, $C_{25}H_{30}O_5$, $C_6H_{12}$, $C_6H_{12}O_2$, may be added to the cation intercalated titanate prior to calcining.

When the dopant is to be boron the gaseous atmosphere is a gas comprising $B_xH_y$. Alternatively boron, $H_3BO_3$, or an organic substances containing B, such as $C_6H_{12}BNO_3$, $C_7H_5BF_4O_2$, $C_7H_7BO_4$, $H_3N.BH_3$, $C_6H_5N(C_2H_5)_2.BH_3$ may be added to the cation intercalated titanate prior to calcination.

In the case that the dopant is sulphur the gaseous atmosphere comprises $H_2S$. Alternatively S, $(NH_4)_2S$, or sulphur containing organic substances, such as $CS(NH_2)_2$, $C_7H_7SO_2$, $C_7H_{12}O_2S$, $C_5H_4S$, may be added to the intercalated titanate.

If the dopant is fluorine, the cation intercalated titanate may be in contact with $NH_4F$ or fluorine containing organic substances, such as $C_4Cl_2F_6$, $C_4H_2F_2N_2$, $C_4H_8BrF$.

When the dopant is iodine, with the cation intercalated titanate may be in contact with $HIO_3$, $HIO_4$, $NH_4I$, $NH_4IO_3$, or organic substances containing iodine, such as $C_4H_9I$, $C_5H_3IO_2$, $C_5H_3F_1$, $C_6H_{13}I$.

It is believed that the ion exchange or protonation step of step 3 leads to the replacement of the alkali metal cation by proton(s) in layered titanate structure to form protonated doped titanate photocatalyst of formula (Ib).

Photocatalyst of the formula (Ib) wherein the value of m is reduced by an amount "a" (where a is a value less than or equal to m) and x-m is 0, may be formed by heating a photocatalyst of formula (Ib), wherein m is a value greater than 0 and less than or equal to 8; and x-m is 0, at a temperature selected between room temperature and about 800° C. This can be summarised as:

Step 4

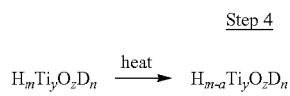

$$H_mTi_yO_zD_n \xrightarrow{heat} H_{m-a}Ti_yO_zD_n$$

wherein D is a dopant selected from the group consisting of boron, carbon, nitrogen, fluorine, sulphur, phosphorus and iodine;
x is a value either equal to m or greater than m and a value which is greater than 0 and less than or equal to 8;
y is a value greater than 0 and less than or equal to 8;
n and z are independently a value greater than 0 and less than or equal to 8;
m is a value between 0 and 8; and
a is a value between 0 and 8.

Example 1

Production of a Nitrogen Doped Caesium Intercalated Titanate (CsTiON) Photocatalyst 30 g of caesium carbonate ($Cs_2CO_3$) and 40 g of titania ($TiO_2$) were mixed and calcined at 750° C. in air for 20 hours to obtain 60-70 grams of white crystalline caesium intercalated titanate (CsTiO).

20 g of the resulting CsTiO was then calcined at 700° C. in an atmosphere of ammonia and argon (volume ratio 1:1) introduced to the furnace at a flux of 50 ml/min for 60 min to obtain yellow crystalline CsTiON.

FIG. 1 of the drawings illustrates the XRD patterns for CsTiO and CsTiON produced by the method of this example.

Figure 2:
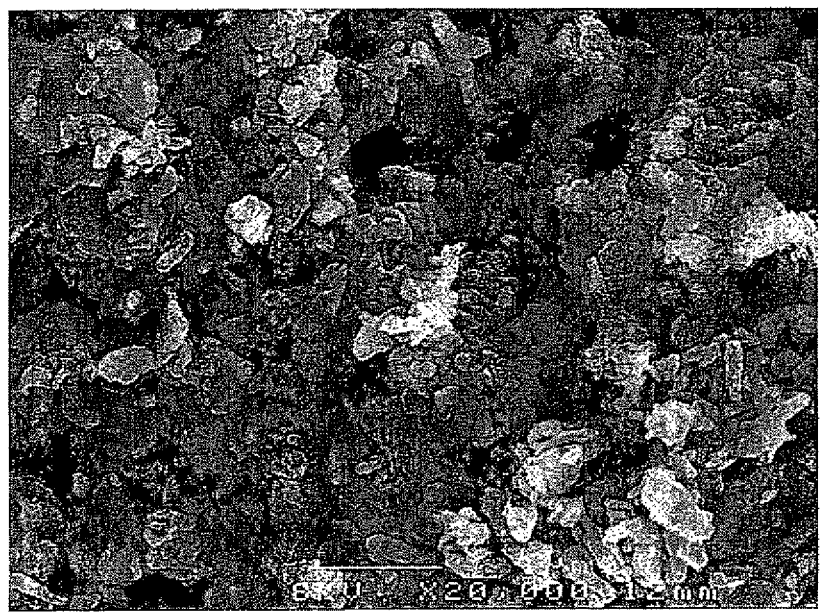

FIG. 2 is a SEM micrograph of the CsTiON produced by the method of this example.

Figure 3:
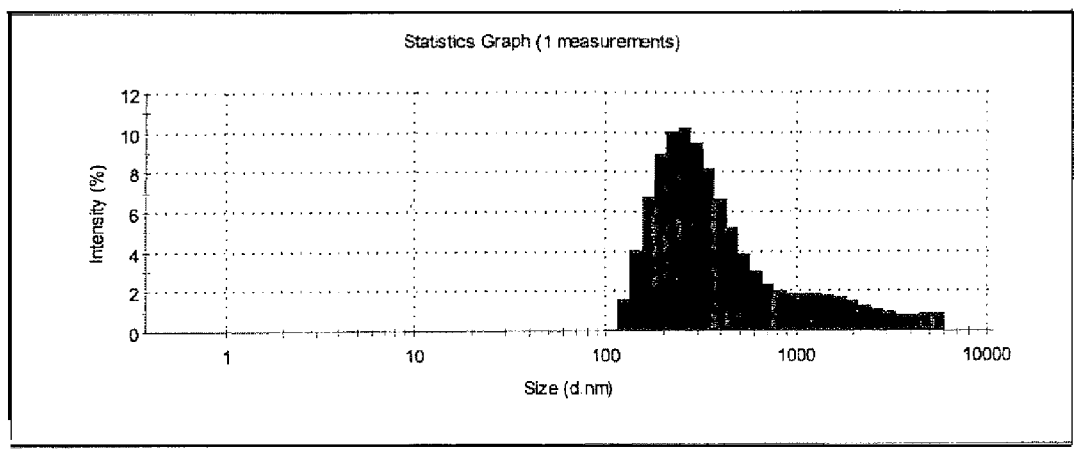

FIG. 3 shows the particle distribution for the CsTiON produced by this example. It can be seen that the bulk of the CsTiON particles produced by the method of this example are have a particle size of between 150 nm and 600 nm.

Figure 4:
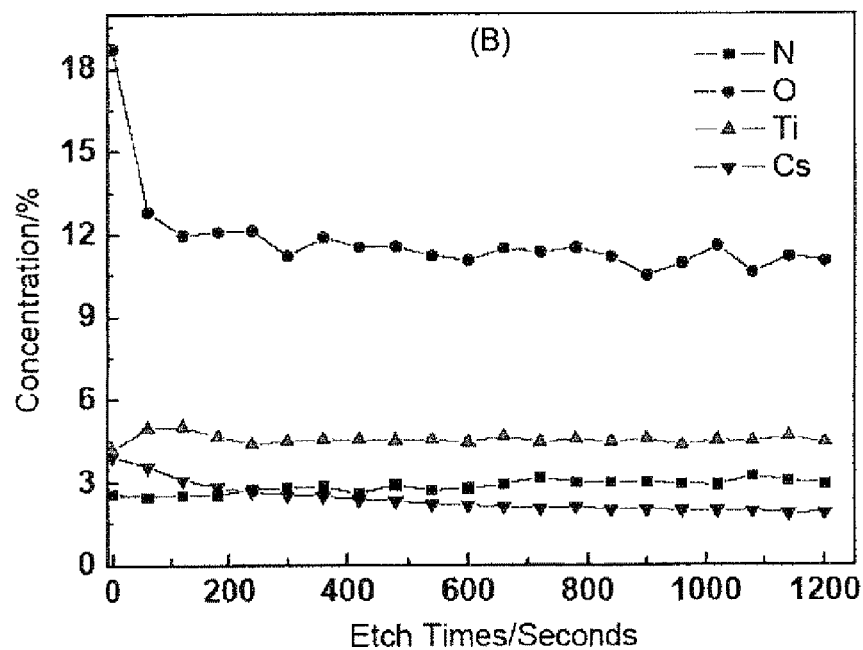

FIG. 4 presents the XPS depth profiles of elements Cs, Ti, O, N in the photocatalyst CsTiON of this example.

Example 2

Production of a Protonated Nitrogen Doped Titanate (HTiON) Photocatalyst

The CsTiON from Example 1 was suspended in 1M hydrochloric acid (HCl) for 3 days to obtain HTiON, a white powder. The HTiON photocatalyst was filtered from solution and dried.

Figure 5:
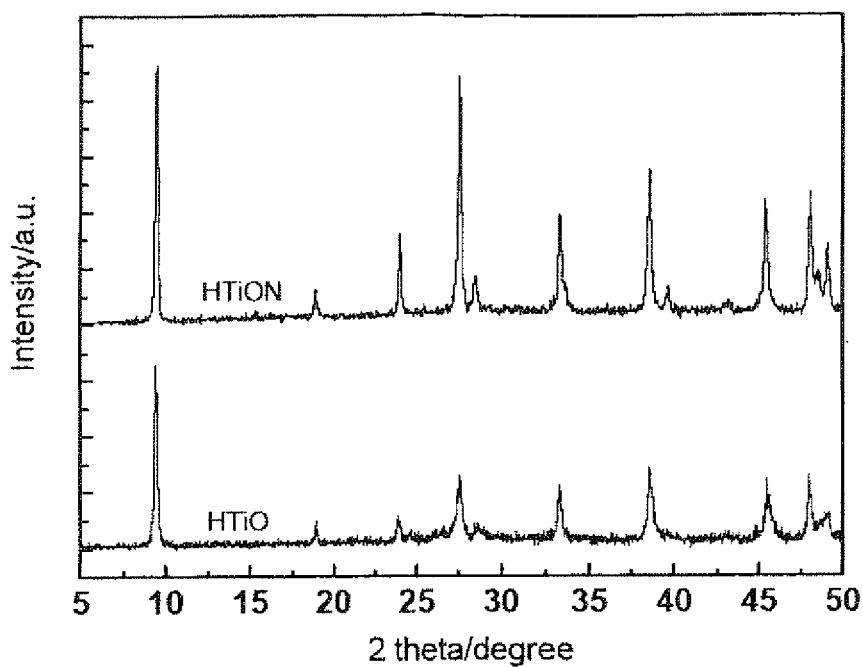

FIG. 5 presents the XRD patterns for HTiO and HTiON produced by the method of Example 2.

Figure 6:

FIG. 6 is a scanning electron micrograph of the HTiON produced by the method of this example.

Figure 7:
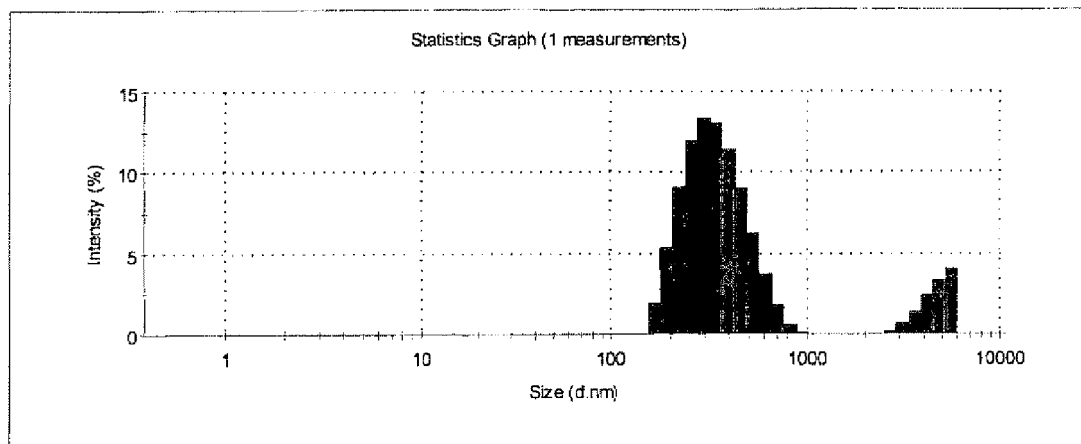
FIG. 7 is a particle size distribution of the HTiON photocatalyst.

FIG. 7 shows the particle distribution for the HTiON produced by this example. It can be seen that the HTiON particles produced by the method of this example are have a particle size of between 175 nm and 700 nm.

Figure 8:
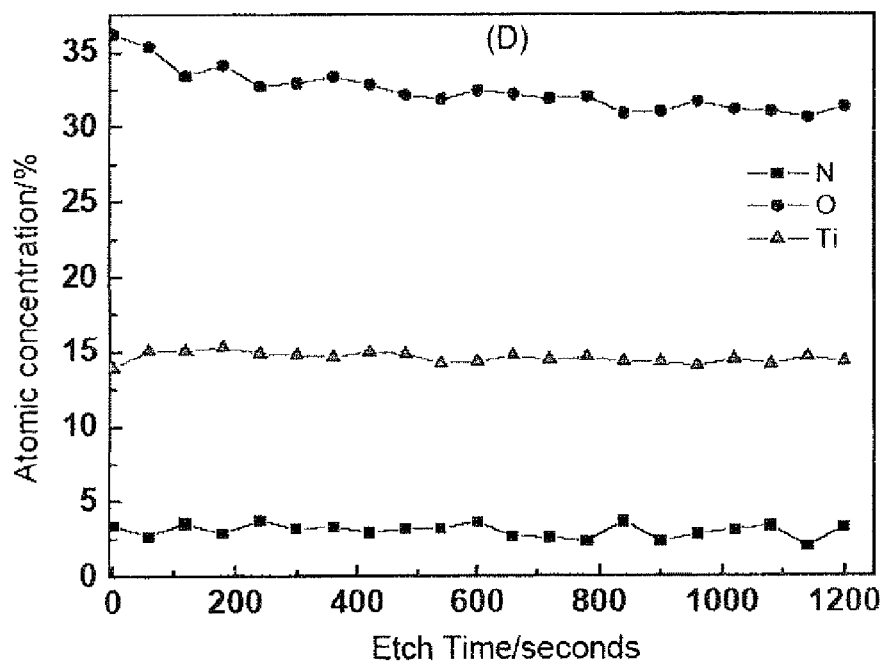
FIG. 8 shows the XPS depth profiles of elements Ti, O, N in the HTiON photocatalyst.

FIG. 8 presents the XPS depth profiles of elements Ti, O, and N in the HTiON photocatalyst.

The HTiON photocatalyst produced by this example may be heated at a temperature between 50° C. to 800° C. in order to de-protonate the photocatalyst and produce a TiON photocatalyst. The TiON photocatalyst has good visible light absorbance and good photocatalytic activity, discussed in more detail below.

The nitrogen doped titanate (TiON) photocatalyst produced by this example differs in structure from the nitrogen doped titania photocatalyst produced by prior art methods. The nitrogen doped titania photocatalyst of the prior art simply adsorbs nitrogen into the upper surface of the titania particles. It is believed that this surface adsorption and gradient distribution of nitrogen into the titania particles is the reason why the known nitrogen doped titania photocatalyst only exhibit a small shoulder of absorbance in the visible range.

Without wanting to be bound by any theory it is believed that, in contrast, the nitrogen doped titanate photocatalyst produced by the invention maintains the layered structure of the titanate throughout the process and the alkali metal cations and/or protons are intercalated into the interlayer gallery, or between the layers of nitrogen doped titanate during Steps 1 to 3 described above. In the case when the photocatalyst of formula (Ib) is HTiON it is believed that the protons replace the alkali metal cations within the interlayer galleries. The subsequent de-protonation step, step 4 summarised above, removes, or reduces the amount of, the proton in the HTiON photocatalyst from the interlayer galleries. Thus the TiON produced by the method of the invention has a layered titanate structure wherein some of the oxygen from the titanate is replaced homogeneously with the dopant, nitrogen.

Example 3

Comparison of UV-Visible Light Absorbance

Figure 9:
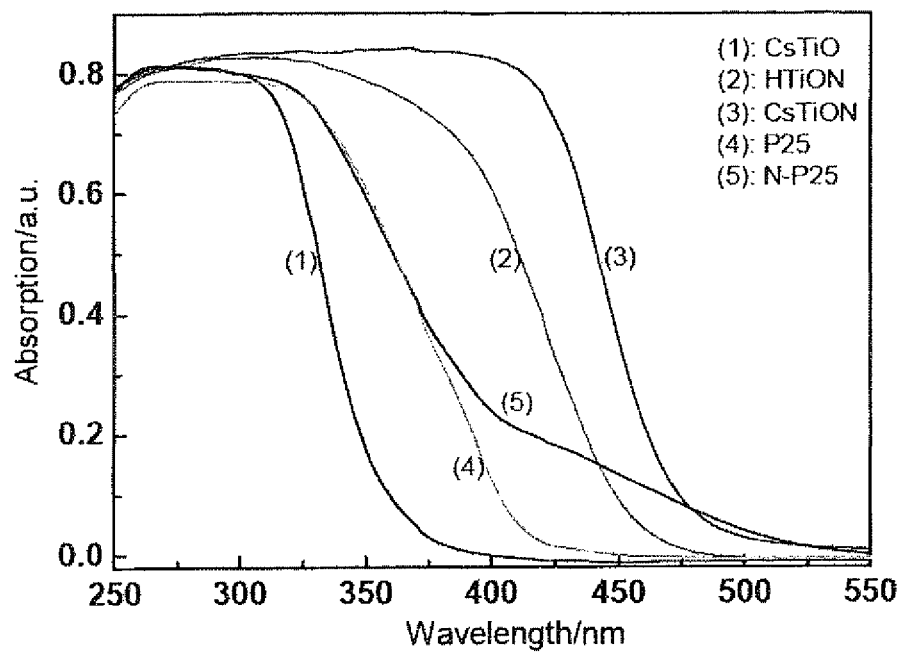
FIG. 9 illustrates the absorption of UV-Visible light by photocatalysts CsTiON and HTiON compared to a known photocatalyst.

FIG. 9 illustrates the UV-visible light absorbance of CsTiO; CsTiON and HTiON produced in Examples 1 and 2 above.

The UV Visible absorbance was also compared with a commercially available titania photocatalyst, P25 (commercially available and produced by Degussa) having a particle size of approximately 30 nm, and a nitrogen doped titania photocatalyst (NP25). NP25 was prepared by widely recognized nitrogen doping method of calcining P25 in an ammonia atmosphere.

P25 only shows absorption in the UV range, while the NP25 has a shoulder of absorbance in the visible light range between 400 nm to 500 nm. The absorption of NP25 in the visible range is at a very low level.

It can be seen from FIG. 9 that the CsTiON and HTiON formed in Examples 1 and 2 have significant absorption in both the UV and Visible wavelengths between 250 nm to approximately 500 nm.

Figure 10:
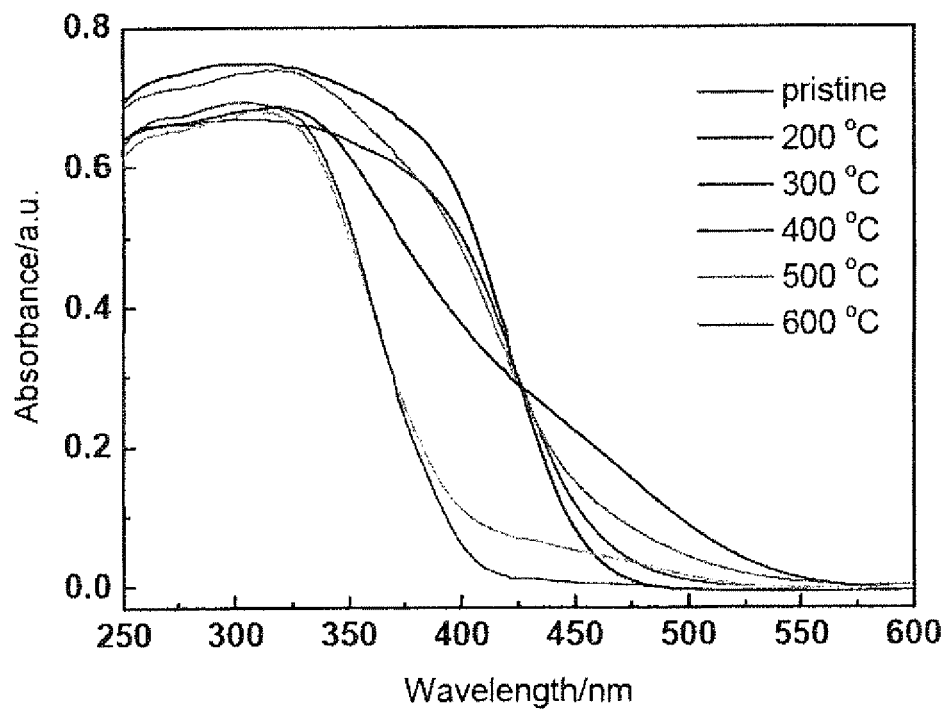
FIG. 10 illustrates the absorption of UV-Visible light by photocatalysts HTiON and TiON, formed at various temperatures.

FIG. 10 illustrates the UV-visible light absorbance of HTiON (referred to in the graph as pristine) and TiON formed by heating HTiON of Example 2 at various temperatures between 200° C. and 600° C. It can be seen from FIG. 10 that as the temperature of heating used to convert HTiON to TiON is increased there is a corresponding decrease in absorption in the visible wavelength range.

Example 4

Photocatalytic Activity

In order to test the photocatalytic activity of CsTiON and HTiON, 0.1 grams of photocatalyst were added to 100 ml solution of $4\times10^{-5}$ M rhodamine. The solutions were irradiated with visible light, at a wavelength of 420 nm to 770 nm.

For comparison, a similar test was conducted using no photocatalyst and NP25.

Figure 11:
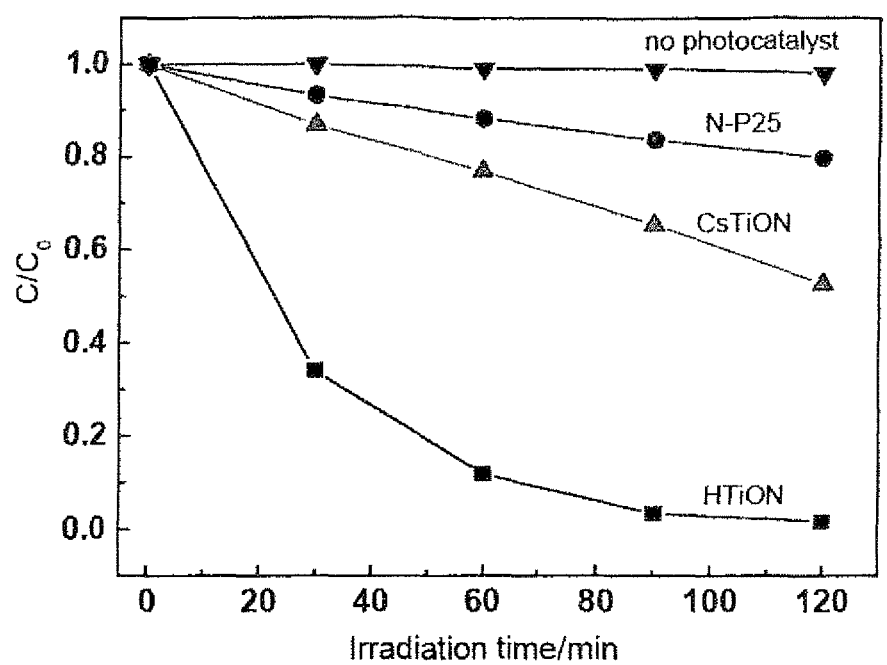
FIG. 11 illustrates the decomposition of Rhodamine by photocatalysts CsTiON and HTiON when irradiated with visible light compared with the decomposition of Rhodamine by a known photocatalyst.

The decomposition of rhodamine by the respective photocatalysts is shown in FIG. 11. It can be seen that over a two hour period CsTiON decomposes twice the amount of rhodamine than P25, a commercially available photocatalyst.

To the Applicant's surprise HTiON has much higher photocatalytic activity with nearly all the rhodamine being decomposed in just an hour and half.

The doped titanate photocatalysts of the invention have been found to be highly efficient, stable, non-toxic and have good facile recyclability, low cost of production, good absorbance and photocatalytic activity when exposed to visible light and are easily recoverable after use.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations or any two or more of said steps or features.

The invention claimed is:

1. A titanate photocatalyst of formula (I):

$$H_m A_{x-m} Ti_y O_z D_n \qquad (I)$$

wherein:
- A is a cation selected from the group consisting of lithium, sodium, potassium, rubidium, caesium and francium;
- D is a dopant selected from the group consisting of boron, carbon, nitrogen, fluorine, sulphur, phosphorus and iodine;
- x is a value greater than 0 and less than or equal to 8;
- y is a value greater than 0 and less than or equal to 8;
- n is a value greater than 0 and less than or equal to 8;
- z is a value greater than 0 and less than or equal to 8;
- m is a value greater than 0 and less than or equal to 8; and
- x-m is a value equal to or greater than 0.

2. The titanate photocatalyst of claim 1, wherein x and y are independently a value between 0.5 and 1, inclusively; z and n are independently a value between 1 and 2, inclusively; and D is nitrogen.

3. The titanate photocatalyst of claim 1, wherein m, x, y, n, and z are all 1 and D is nitrogen.

4. The titanate photocatalyst of claim 1, wherein m is 1; x is 2; y, z and n are all 1 and D is nitrogen.

5. A titanate photocatalyst of formula (Ia):

$$A_x Ti_y O_z D_n \qquad (Ia)$$

wherein:
- A is a cation selected from the group consisting of lithium, sodium, potassium, rubidium, caesium and francium;
- D is a dopant selected from the group consisting of boron, carbon, nitrogen, fluorine, sulphur, phosphorus and iodine;
- x and y are independently a value greater than 0 and equal to or less than 8; and
- n and z are independently a value greater than 0 and equal to less than 8.

6. The titanate photocatalyst of claim 5, wherein A is caesium and D is nitrogen.

7. A method of producing a titanate photocatalyst of formula (Ia), $$A_x Ti_y O_z D_n \qquad (Ia)$$

wherein:
- A is a cation selected from the group consisting of lithium, sodium, potassium, rubidium, caesium and francium;
- D is a dopant selected from the group consisting of boron, carbon, nitrogen, fluorine, sulphur, phosphorus and iodine;
- x and y are independently a value greater than 0 and equal to or less than 8; and
- n and z are independently a value greater than 0 and equal to less than 8, including the steps of:
a. forming a mixture comprising at least one cation donor precursor and at least one titanate precursor;
b. calcining the mixture to form a cation intercalated titanate;
c. contacting the cation intercalated titanate with a dopant and calcining to form the photocatalyst of formula (Ia).

8. The method of claim 7, wherein said at least one cation donor precursor is an alkali metal salt selected from the group consisting of alkali metal halides, alkali metal sulphides, alkali metal sulphates, alkali metal carbonates, alkali metal nitrates; alkali metal hydroxides; alkali metal acetates; alkali metal dimethenylamine; alkali metal oxide; alkali metal chlorate, alkali metal phosphate and mixtures thereof.

9. The method of claim 7, wherein said at least one titanate precursor is selected from the group consisting of titanium nitride (TiN), titanium carbide (TiC), titanium cyanide ($TiC_xN_y$), titanium diboride ($TiB_2$), titanium sulphide ($TiS_2$), titanium halide, titanium oxide, titanium hydroxide, titanium phosphide (TiP), titanium sulphate, titanium silicides ($TiSi_2$), organic titanium compounds and mixtures thereof.

10. The method of claim 9, wherein the titanium halide is selected from the group consisting of $TiBr_4$, $TiCl_4$, $TiCl_3$, $TiBr_3$, $TiF_3$, $TiF_4$, and $TiI_4$.

11. The method of claim 9, wherein the titanium oxide is selected from the group consisting of TiO, $Ti_2O_3$, $Ti_3O_5$, $TiO_2$, $TiO_xN_y$, and $TiO_xC_y$, where x and y independently have a value of between 1 and 4, inclusively.

12. The method of claim 9, wherein the organic titanium compound is selected from the group consisting of $Ti(OCH(CH_3)_2)_4$, $Ti[O(CH_2)_3CH_3]_4$, and $Ti(OCH_3)_4 \cdot (CH_3OH)_x$, where x is a value greater than 0 and equal to or less than 8.

13. The method of claim 7, wherein said at least one cation donor precursor and said at least one titanate precursor are calcined at a temperature between 500° C. to 1200° C. for a period of between 0.5 to 40 hours.

14. The method of claim 7, wherein the dopant is a gas, which is selected from the group consisting of nitrogen, ammonia, methane, ethylene, propane, butane, fluorine, carbon monoxide, carbon dioxide and mixtures thereof.

15. The method of claim 7, wherein the dopant is one or more organic compounds selected from the group consisting of $C_6H_{12}N_4$, $CO(NH_2)_2$, $CS(NH_2)_2$, triethylamine, $(NH_4)_2CO_3$, $C_{25}H_{31}N_3$, $C_{12}H_{22}O_{11}$, $C_{25}H_{30}O_5$, $C_6H_{12}$, $C_6H_{12}O_2$, $C_6H_{12}BNO_3$, $C_7H_5BF_4O_2$, $C_7H_7BO_4$, $H_3N.BH_3$, $C_6H_5N$ $(C_2H_5)_2 \cdot BH_3$, $CS(NH_2)_2$, $C_7H_7SO_2$, $C_7H_{12}O_2S$, $C_6H_4S$, $C_4Cl_2F_6$, $C_4H_2F_2N_2$, $C_4H_8BrF$, $C_4H_9I$, $C_5H_3IO_2$, $C_5H_3FI$, and $C_6H_{13}I$.

16. The method of claim 7, wherein the dopant is an inorganic compound or solution selected from the group consisting of: carbon, boron, sulphur, ammonium sulphide, iodine, $HIO_3$, $HIO_4$, $NH_4I$, $NH_4IO_3$ and mixtures thereof.

17. The method of claim 7, wherein the cation intercalated titanate is calcined with the dopant at a temperature of between 200° C. to 1800° C. for a period between 30 mins and 5 days.

18. The method of claim 7, further including placing the titanate photocatalyst in an atmosphere having suitable light and converting an introduced pollutant to a substantially inert state.

19. A method of producing a layered titanate photocatalyst, including the steps of:

placing the photocatalyst of formula (Ia):

$$A_xTi_yO_zD_n \quad (Ia)$$

wherein A is a cation selected from the group consisting of lithium, sodium, potassium, rubidium, caesium and francium, D is a dopant selected from the group consisting of boron, carbon, nitrogen, fluorine, sulphur, phosphorus and iodine, x and y are independently a value greater than 0 and equal to or less than 8, and n and z are independently a value greater than 0 and equal to or less than 8, in an acidic solution to form the photocatalyst of formula (I):

$$H_mA_{x-m}Ti_yO_zD_n \quad (I)$$

wherein: A is a cation selected from the group consisting of lithium, sodium, potassium, rubidium, caesium and francium;

D is a dopant selected from the group consisting of boron, carbon, nitrogen, fluorine, sulphur, phosphorus and iodine;

x is a value greater than 0 and less than or equal to 8;
y is a value greater than 0 and less than or equal to 8;
n is a value greater than 0 and less than or equal to 8;
z is a value greater than 0 and less than or equal to 8;
m is a value greater than 0 and less than or equal to 8; and
x-m is a value equal to or greater than 0;

and filtering, separating and drying the titanate photocatalyst of formula (I).

20. The method of claim 19, wherein the acidic solution is selected from the group consisting of hydrochloric acid (HCl), nitric acid ($HNO_3$), sulphuric acid ($H_2SO_4$), phosphoric acid, hydrogen fluorine, hydrogen iodine, hydrogen bromide, acetic acid (HAC), perchlorate acid, iodic acid ($HIO_3$), periodic acid ($HIO_4$) and mixtures thereof.

* * * * *